May 11, 1943.    C. C. THOMAS    2,318,725
SACKING AND MEASURING DEVICE
Filed Nov. 17, 1941    3 Sheets-Sheet 2
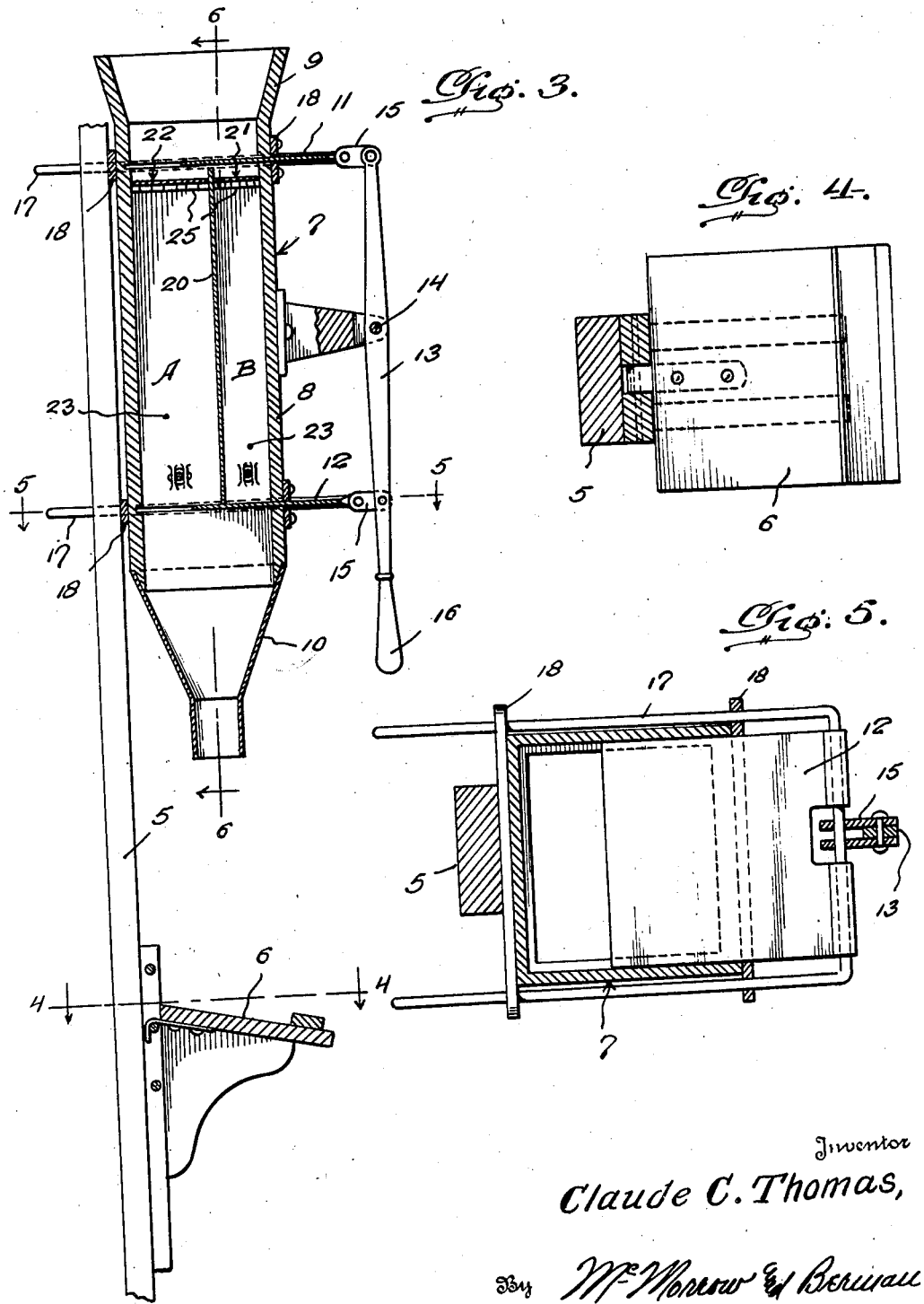
Inventor
Claude C. Thomas, May 11, 1943.　　　C. C. THOMAS　　　2,318,725
SACKING AND MEASURING DEVICE
Filed Nov. 17, 1941　　　3 Sheets-Sheet 3
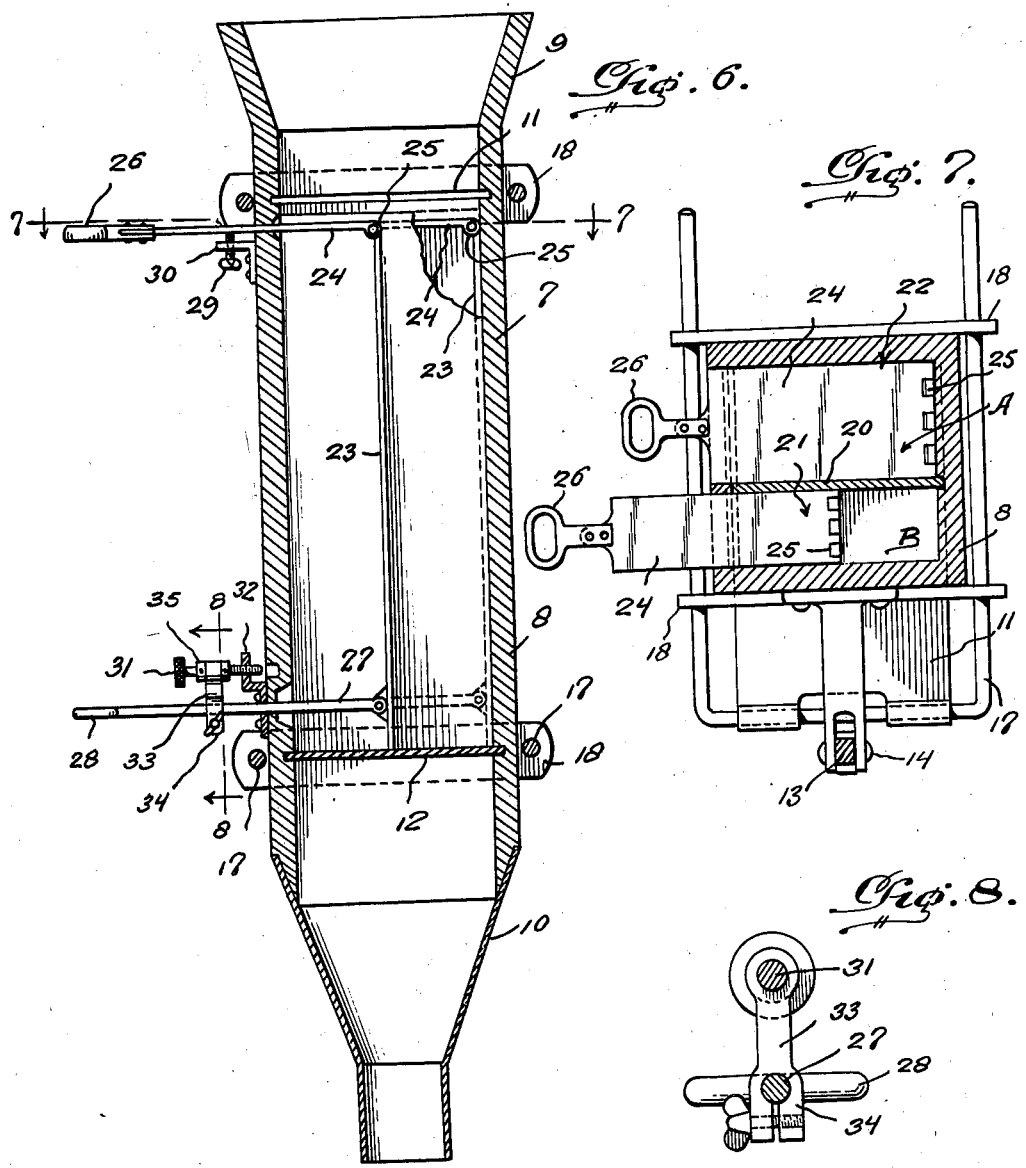
Inventor
Claude C. Thomas,
By McMorrow & Berman
Attorneys Patented May 11, 1943

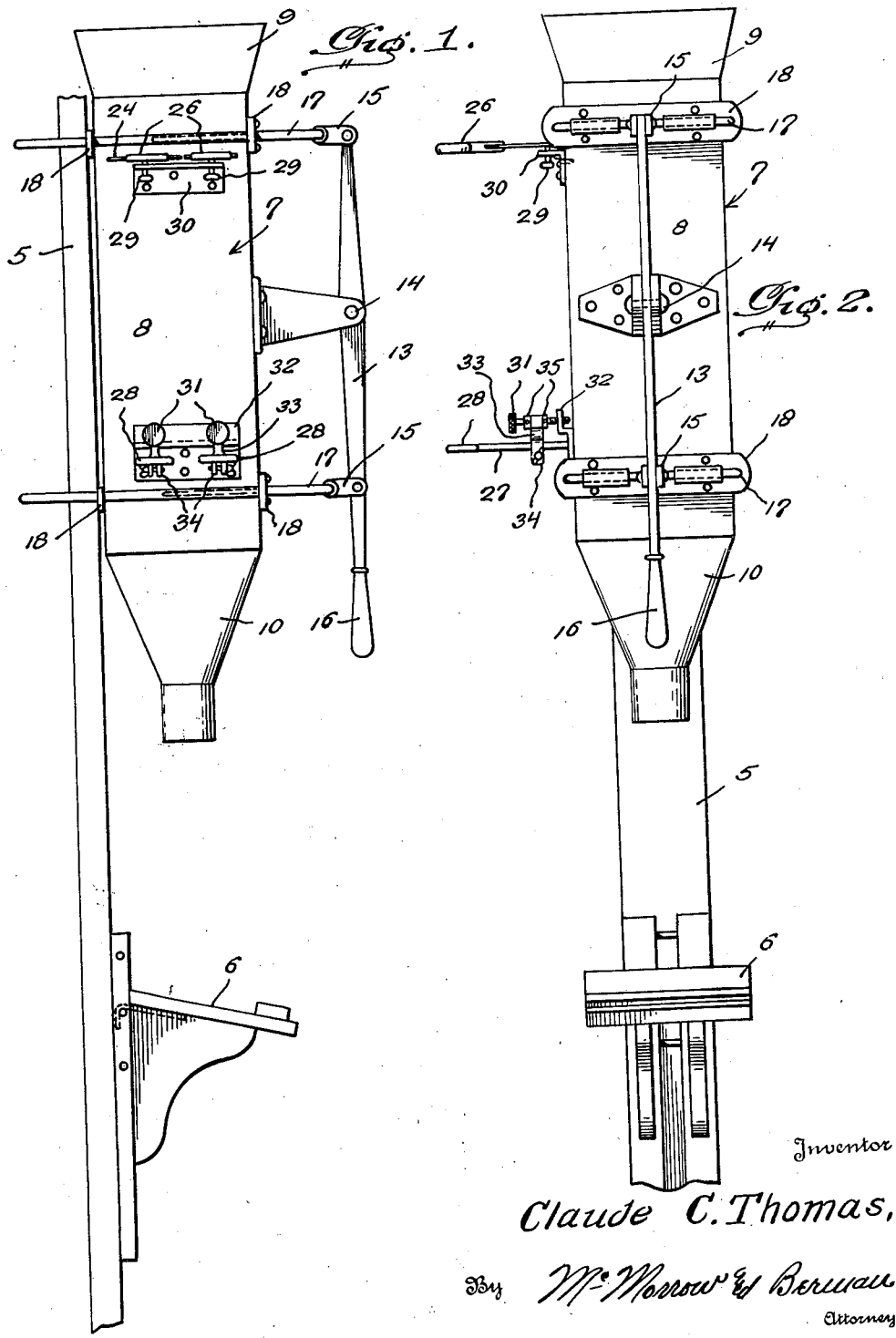

2,318,725

UNITED STATES PATENT OFFICE 2,318,725

SACKING AND MEASURING DEVICE

Claude C. Thomas, Birmingham, Ala., assignor of one-half to E. H. Clements, Roanoke, Va.

Application November 17, 1941, Serial No. 419,481

3 Claims. (Cl. 221—113)

This invention relates to a sacking and measuring device, and has for the primary object the provision of a device of this character which is especially adapted for conveniently dispensing without waste and in predetermined amounts, grain, granular materials and the like into sacks or similar containers from a source of supply and which may be easily adjusted at the will of the operator to vary the amounts dispensed.

With these and other objects in view as will become more apparent as the description proceeds, the invention consists in certain novel features of construction, combination and arrangement of parts which will be hereinafter more fully described and claimed.

For a complete understanding of my invention, reference is to be had to the following description and accompanying drawings, in which:

Figure 1 is a side elevation illustrating a sacking and measuring device constructed in accordance with my invention.

Figure 2 is a front elevation illustrating the device.

Figure 3 is a vertical sectional view illustrating the device.

Figure 4 is a sectional view taken on the line 4—4 of Figure 3.

Figure 5 is a sectional view taken on the line 5—5 of Figure 3.

Figure 6 is a sectional view taken on the line 6—6 of Figure 3.

Figure 7 is a sectional view taken on the line 7—7 of Figure 6.

Figure 8 is a detail sectional view taken on the line 8—8 of Figure 6.

Referring in detail to the drawings, the numeral 5 indicates a vertically arranged supporting member on which is mounted a supporting shelf 6 on which a sack or like container may be rested. Arranged above the shelf 6 on the supporting member 5 is a combined sacking and measuring device 7 including an elongated receptacle 8 comprising a flared mouth 9 to receive grain, granular material or the like from a suitable supply (not shown). The opposite or lower end of the receptacle is of substantially funnel shape, as shown at 10, for discharging the material into a sack or receptacle on the shelf 6.

To control the movement of material through the receptacle 8 and in predetermined and varied amounts, upper and lower gates 11 and 12 are provided. The gates are horizontally arranged and mounted for alternate reciprocal movement through the operation of a hand lever 13 pivoted intermediate its ends, as shown at 14, and is provided with links 15 pivotally connected to said gates. The lower end of the lever is provided with a hand grip 16 to permit the operator holding the sack or container on the shelf and in position to receive the material to first open the upper gate and simultaneously close the lower gate so that the area between said gates may fill with the material whereupon the next movement of the lever on its pivot closes the upper gate and opens the lower gate cutting off the supply to the receptacle 8 and permitting the material confined within the receptacle 8 between the gates to discharge into the sack or container resting upon the shelf.

Substantially U-shaped guide members 17 are slidably supported in guide members 18 secured to opposite walls of the receptacle 8 and have journaled thereon the gates 11 and 12. The links 15 are also journaled on the guide members 17.

To divide the area within the receptacle 8 between the gates into a pair of spaces A and B, a relatively fixed partition 20 is located in said receptacle 8 and may be removed at any time desired by way of the mouth 9 of the receptacle.

To increase and decrease the sizes of the spaces A and B regulators 21 and 22 are provided. The regulators 21 and 22 are mounted for sliding movement with frictional contact with walls of the receptacle 8 and the partition 20 and each includes a vertically arranged plate 23 and a horizontally disposed upper plate 24 lying in close proximity to the gate 11 and slidable through a wall of the receptacle 8. The upper plate 24 is hinged to the vertical plate 23, as shown at 25, and its outer end is provided with a hand grip 26.

An adjusting rod 27 is pivotally connected to the vertical plate 23 adjacent its lower end and is slidable through one of the walls of the receptacle 8 and terminates in a hand grip 28. A set screw 29 carried by a bracket 30 on the receptacle 8 may be turned into engagement with the plate 24 for releasably securing the same in any of its adjusted positions.

An adjusting screw 31 is threaded in a bracket 32 carried by the receptacle 8 and has journaled thereon an arm 33 provided with a clamp 34 to receive and grip the adjusting rod 27. The arm 33 is held against endwise movement of the adjusting screw 31 by collars 35.

The partition 20 and the regulators 21 and 22 permit the operator of the device to easily and quickly vary the amount of material which the present invention will dispense from the source of the material to the receiving container or sack.

By referring to the drawings, it will be seen that the operator can readily adjust the regulator 22 to completely close one of the spaces while the other regulator may be adjusted to vary the area of the other space so that material will only be received in the latter-named space and discharged therefrom through the manipulation of the upper and lower gates by said operator. The use of the regulators by the operator permits a wide range of adjustments to be made for the amounts of material dispensed by the device.

To adjust the regulators, the set screws 29 are released and the upper plates 24 are manually slid relative to the mouth 9 of the receptacle 8 to either completely close one of the spaces to the mouth and the other space partly closed to the mouth or to vary the size of the spaces with respect to the mouth. After the upper plates have been adjusted to the proper places the set screws 29 are turned thereagainst to hold said plates in a relatively fixed position. The vertical plates 23 then may be adjusted through the manipulation of the adjusting screws 31 to either increase or decrease the areas of the spaces. The adjustments of the plates 23 take place through the sliding movement of the adjusting rods 27 and the hinges 25 on the plates 24.

While I have shown and described the preferred embodiment of my invention, it will be understood that minor changes in construction, combination and arrangement of parts may be made without departing from the spirit and scope of the invention as claimed.

Having thus described the invention, what I claim is:

1. In a sacking and measuring device, a vertically disposed receptacle having material receiving and discharge ends, gates for opening and closing said ends of the receptacle and defining therebetween within said receptacle a measuring area, operating means for opening and closing said gates, a partition in said receptacle between the gates for dividing said area into vertically arranged spaces of different size from each other, regulators in said spaces for increasing and decreasing the size thereof and each including a vertically arranged plate and a horizontally disposed plate hinged to the upper end of the vertical plate and slidable through a wall of the receptacle, and means for adjusting said vertical and horizontal plates independently of each other and horizontally of the spaces.

2. In a sacking and measuring device, a vertically disposed receptacle having material receiving and discharge ends, gates for opening and closing said ends of the receptacle and defining therebetween within said receptacle a measuring area, operating means for opening and closing said gates, a partition in said receptacle dividing said area into vertically arranged spaces of different size from each other, regulators in said spaces for increasing and decreasing the size thereof and each including a vertically arranged plate and a horizontally disposed plate hinged to one end of the vertically arranged plate and slidable through a wall of the receptacle, set screws to engage the horizontal plates for releasably securing the latter in adjusted position, and adjusting means connected to the other end of the vertically arranged plates for the adjustment thereof.

3. In a sacking and measuring device, a vertically disposed receptacle having material receiving and discharge ends, gates for opening and closing said ends of the receptacle and defining therebetween within said receptacle a measuring area, operating means for opening and closing said gates, a partition in said receptacle dividing said area into vertically arranged spaces, regulators in said spaces for increasing and decreasing the size thereof and each including a vertically arranged plate and a horizontally disposed plate hinged to one end of the vertically arranged plate and slidable through a wall of the receptacle, set screws to engage the horizontal plates for releasably securing the latter in adjusted position, adjusting rods pivoted to the other ends of the vertical plates and slidable through a wall of the receptacle, and adjusting means connected to said rods and mounted on the receptacle.

CLAUDE C. THOMAS.